June 8, 1965  P. M. FOWLER ETAL  3,188,045
LOCKABLE ADJUSTMENT MEANS
Filed Aug. 27, 1962  2 Sheets-Sheet 1
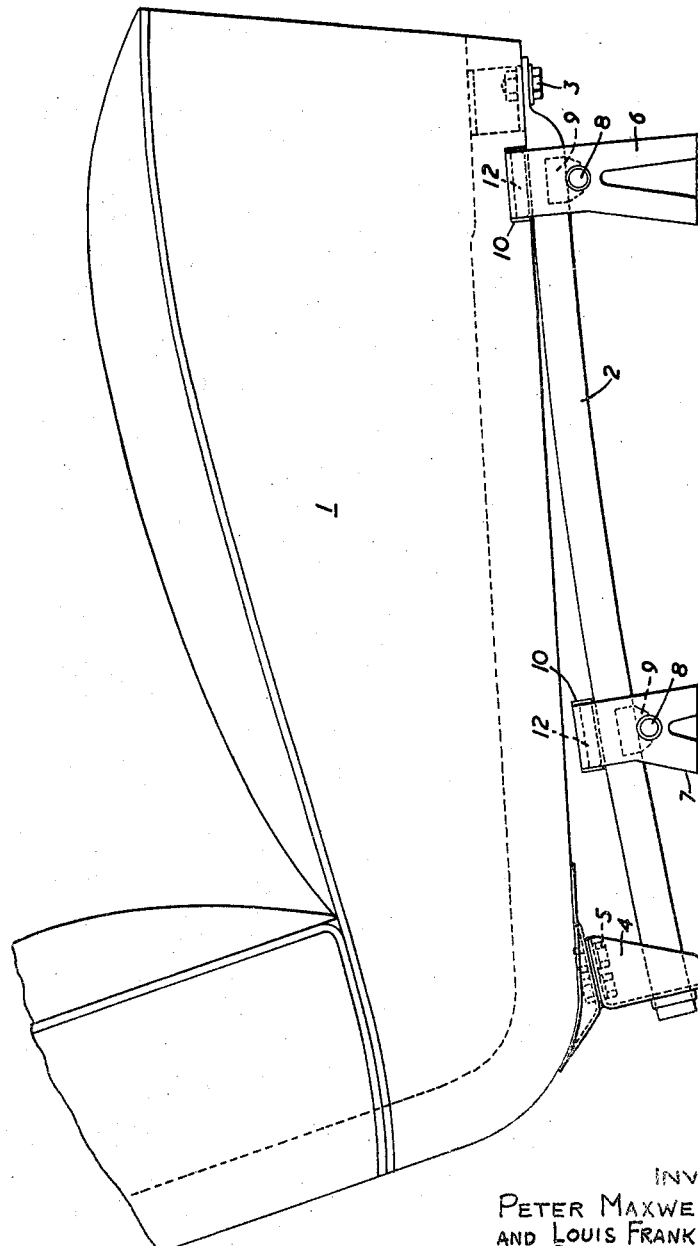
FIG. I.
INVENTORS
PETER MAXWELL FOWLER
AND LOUIS FRANK CHARLES JAY
BY Irvin S. Thompson
ATTORNEY

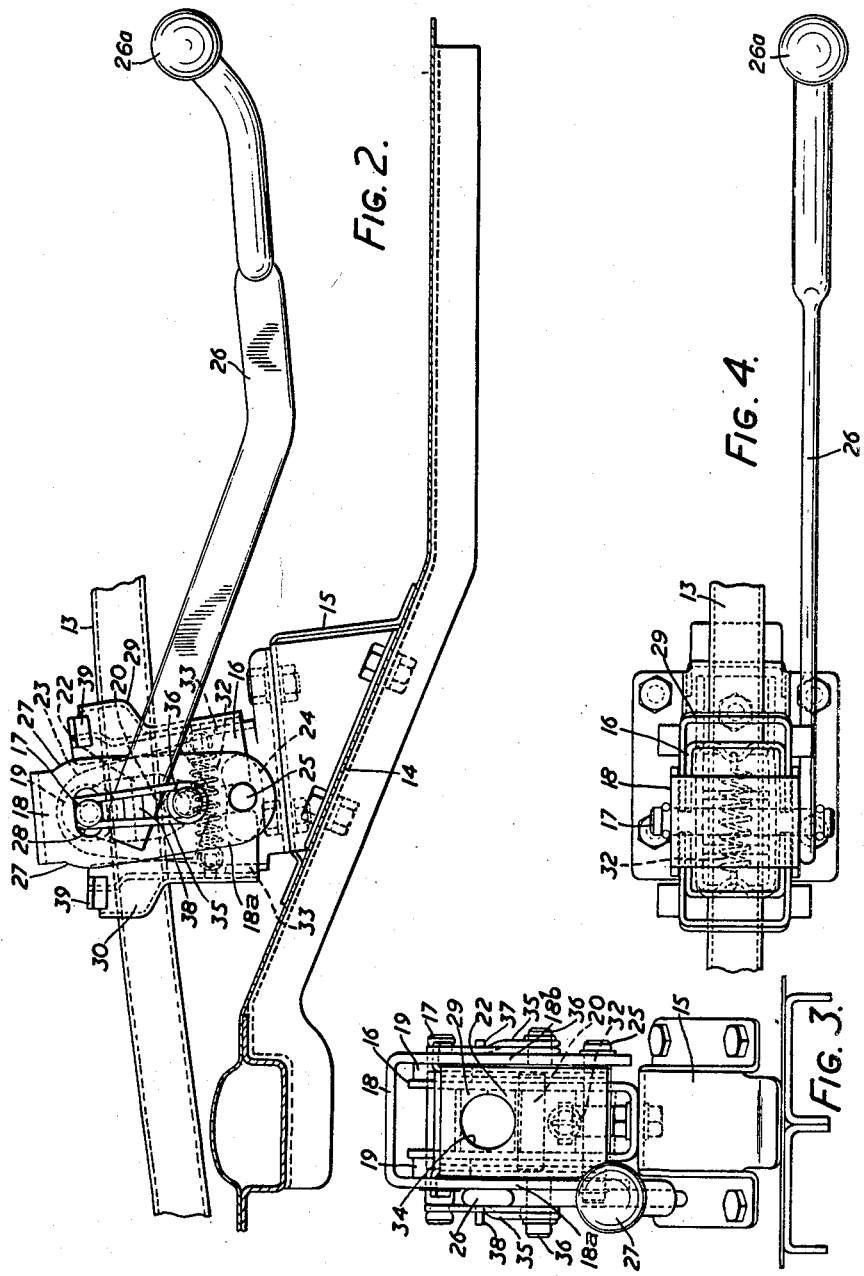

United States Patent Office 3,188,045
Patented June 8, 1965

3,188,045
LOCKABLE ADJUSTMENT MEANS
Peter Maxwell Fowler, Dorridge, Solihull, and Louis Frank Charles Jay, Shirley, Solihull, England, assignors to Wilmot-Breeden Limited, Birmingham, England
Filed Aug. 27, 1962, Ser. No. 219,618
Claims priority, application Great Britain, Aug. 25, 1961, 30,651/61
14 Claims. (Cl. 248—429)

This invention relates to lockable adjustment means which enable the position of a member with which they are associated to be adjusted and the member then locked in the adjusted position.

According to the invention lockable adjustment means for a movable member comprise two locking members which are urged in opposite directions to limit positions and frictionally engage the movable member with a locking action so that when in said limit positions they lock the movable member against movement in either direction, and manually operable adjusting means which can be operated to engage either one of the locking members to move it, and with it the movable member, in the corresponding direction away from the corresponding limit position and at the same time engage the other locking member to free it from locking engagement with the movable member, the arrangement being such that on release of the adjusting means both locking members are returned to locking engagement with the movable member without return movement of the latter.

It will thus be seen that the invention provides an arrangement in which the locking action of the locking members on the movable member is used not only to lock the latter in the adjusted position but also to move it to that position.

Preferably the locking members are in the form of friction plates with an aperture through which the movable member passes, the two members normally being oppositely inclined with respect to the direction of movement of the movable member so that corresponding edges of the apertures engages the latter member with a servo locking action. The greater a force tending to move the movable member in either direction from the locked position the greater the frictional engagement with the corresponding locking member, which would be used to adjust it in the opposite direction, to produce the necessary locking force. The adjusting means are conveniently arranged so that they act simultaneously not only to engage one locking member and move it with the movable member away from the limit position but also to engage the other locking member and turn it to a position in which it is substantially free in the frictional sense from the movable member.

A return spring may be connected between the two locking members urging them to the limit positions to which they are returned by the spring after each adjusting movement. The adjusting means may comprise a hand lever generally pivotable from a central position in one or other direction to provide adjusting movement in a corresponding direction, and the lever may engage the locking members or be attached to an operating member which engages the locking members in a manner such that it not only acts to produce the necessary movement of the latter but also so that it is returned to the central position after each adjusting movement at least partly by the means urging the locking members to the limit positions. The hand lever or operating member may be mounted on a fixed pivot pin for pivoting movement about that pin in a manner such that it is capable of limited sliding movement on the pin to produce the necessary simultaneous operation of the two locking members, and a separate lever return or centralising spring may be fitted to centralise the operating member in respect of the sliding movement.

It will be appreciated that the invention is especially applicable to arrangements in which a large range of movement of the movable member can be covered by "inching" movement of the adjusting means, and an arrangement incorporating a hand lever is very conveniently applied to the seat adjustment of a motor vehicle. In this case the movable member may be a tube of the seat frame or a separate member attached to the frame.

The invention will now be further described with reference to the accompanying drawings which illustrate, by way of example, the application of the invention to the lockable adjustment of a motor vehicle bench-type front seat. In the drawings:

FIGURE 1 is a side view of the seat showing in detail the slidable side support of the seat, FIGURE 2 is a detail side view of lockable adjustment means inaccordance with the invention which are positioned centrally beneath the seat for operation by the vehicle driver, FIGURE 3 is a front view of the means of FIGURE 2 with certain parts omitted for clarity, and FIGURE 4 is a plan view thereof.

Referring first to FIGURE 1, the bench-type seat 1 has attached beneath it at each end a slightly curved slide tube 2. The tubes run fore-and-aft of the vehicle and are each flattened at the front for attachment to the seat 1 by a bolt 3 and attached at the rear by a tube location bracket 4, itself bolted to the seat by bolts 5. Each tube 2 passes through front and rear support brackets 6 and 7 of inverted U shape which are firmly bolted to the vehicle floor. Between the side limbs of each bracket 6 or 7 a pin 8 is fixed below the tube 2, the pin supporting a nylon tube support 9 which forms a slide bearing for the corresponding tube 2 which slides between the supports 9 and support slippers 10 located by the upper limb of the corresponding bracket 6 or 7 and separated therefrom by a rubber block 12.

The nylon supports 9 have an upper groove in which the tubes 2 seat and lower cross grooves which seat on the support pins 8. The curvature of the tubes 2 is chosen to provide the desired seat movement, this curvature being accommodated by turning of the supports 9 on the pins 8. The rubber blocks 12 ensure that there is no vertical play in the seat mounting.

Referring now to FIGURES 2 to 4, an adjuster tube 13 of the same shape as the side support tubes 2 and parallel to the latter is fixed centrally beneath the seat to form a movable member which the adjustment and locking means to the invention engage. In the particular vehicle for which the described arrangement was designed the adjustment means are attached to an inclined floor section 14, a suitable shaped support platform 15 being bolted to the floor to provide a more level mounting generally parallel with the tube 13 and on which is bolted a support bracket 16. The bracket 16 is of pressed form and is generally U shaped as viewed from the front, as shown in FIGURE 3 from which the tube 13 is omitted.

In side view the bracket 16 is of generally triangular form, as shown particularly in FIGURE 2, and towards the upper ends the side limbs thereof support a fixed pivot pin 17. The pin 17 forms a pivoted mounting for an operating member or lever stirrup 18 of inverted U-shaped form and passes laterally through the side limbs of the bracket 16 at right angles to the longitudinal axis of the tube 13; as described hereinafter, the stirrup 18 is capable of limited sliding movement on the pin 17 laterally of the latter. The side limbs of the stirrup 18 are positioned outwardly of the side limbs of the bracket 16, being spaced therefrom by spacing washers 19 mounted on the pin 17.

Between the side limbs of the bracket 16 there is supported a support pin 20 which performs a similar function to the pins 8 already described, and likewise supports a nylon support 22 of similar form and function to the supports 9. An identical nylon support 23 above the tube 13 is likewise engaged by the central portion of the pivot pin 17. Below the pin 20 each side limb of the bracket 16 has a cut-out arcuate slot 24 through which passes with clearance an operating pin 25 which passes through and is fixed in the side limbs 18a and 18b of the stirrup 18.

An operating hand lever 26 terminates at its forwardly projecting end in a knob 26a suitably positioned to be grasped by the driver, and at the rear end is attached to the outer side of the side limb 18a. The lever 26 is movable from a central resting position in either direction according to the direction of seat adjustment required. The side limbs 18a and 18b of the lever stirrup 18 at the level of the pivot pin 17 have at each edge rounded cam-like projections 27. These projections effect unlocking at the same time as adjusting movement is effected by the operating lever 26 in a manner described hereinafter. Bearing apertures 28 one in each of the side limbs 18a and 18b are elongated laterally of those limbs and engage the pivot pin 17 to provide said pivotal mounting. The bearing apertures 28 are of a width which provides a sliding clearance on the pivot pin 17 to allow said limited sliding movement.

Two locking members 29 and 30 in the form of apertured locking plates of pressed complementary form are respectively mounted on the tube 13 at opposite sides of the stirrup 18. The plates 29 and 30 are urged to limit or locking positions in which they are oppositely inclined as shown in FIGURE 2 by a central return spring 32 in tension between the locking plates 29 and 30. In the locking positions the bottom corners of the locking plates 29 and 30 engage turned-in projections 33 on the side limbs of the bracket 16 below the spring 32 so that the plates are respectively upwardly and inwardly inclined with the apertures 34 in the locking plates 29 and 30 engaging the seat tube. The diameter of the locking plate apertures 34, which are accurately circular, is such that in the locking positions the inner upper edge and the outer bottom edge of the apertures 34 respectively engage the tube 13 to provide frictional locking engagement therewith. Any force tending to move the seat through the locking plates 29 and 30 merely causes the aforesaid edges of the apertures 34 to "dig in" to the tube 13 to provide a high frictional servo locking action.

Two U-shaped lever return or centralising springs 35 are respectively mounted at the sides of the stirrup 18, each having a central helically wound portion mounted on a peg 36 projecting from the corresponding side of the stirrup 18 with the two limbs of the spring closely straddling a spring abutment 37 or 38 and the pivot pin 17. The abutment is arranged between the peg 36 and pivot pin 17, and this arrangement provides a centering action for the stirrup 18 and lever 26. In the central resting position of the lever 26 the locking plates 29 and 30 adopt the locking limit positions, with a slight clearance between each locking plate 29 or 30 and the operating pin 25 and a somewhat greater equal clearance between the plate and the corresponding upper rounded projections 27. The abutment 37 is provided by a pressed-out tongue on the side limb 18b, and the abutment 38 is separately attached to the handle 26 where the latter overlies the side limb 18a.

The frictional locking action of the locking plates 29 and 30 is utilised to effect seat adjustment, and when the handle 26 is moved in one angular direction from the resting position the operating pin 25 engages the corresponding locking plate 29 or 30 and moves the latter and, the tube 13 in the corresponding direction. As the pin 25 engages the locking plate below the tube 13 it acts through the corresponding locking plate in a manner which tends to turn the latter into greater locking engagement with the tube 13 to ensure a positive adjusting action. Initially the stirrup 18 pivots about the pin 25 to produce the aforesaid limited sliding movement of the stirrup on the pivot pin 17 to bring the latter to one end of the bearing slot 28. This allows the upper cam-like projections 27 on one side of the lever stirrup 18 to engage the top of the other locking plate 29 or 30 and hence turn the latter towards the unlocked position generally at right angles to the tube 13, so that this other locking plate does not oppose the adjusting movement.

Further pivotal movement of the stirrup 18 and lever 26 now occurs on the pivot pin 17, to move the tube 13 with one locking plate whilst the other locking plate is held in the unlocked position by the corresponding projections 27 which are suitably contoured to that end. The initial sliding movement of the stirrup 18 on the pivot pin 17 enables a constant camming action to be applied to the unlocked locking plate 29 or 30 in a simple and satisfactory manner, in which the adjusting and locking actions are applied simultaneously.

On release of the lever 26 the tension spring 32 returns the locking plates 29 and 30 to the locking limit positions in engagement with the lever stirrup 18 which assists the action of the centering springs 35 which thereafter return the handle 26 to the resting position with the stirrup 18 accurately centered between the plates 29 and 30. Any greater adjustment of the seat 1 than is obtainable by a single handle movement is obtained by a succession of "inching" adjusting movements.

In other words, to move the seat forward, the operator grasps the lever 26 and pulls up. The first thing that happens is that the entire assembly of lever 26 and stirrup 18 swings counterclockwise as seen in FIG. 2 until the projections 27 contact the lugs 39 and swing the locking plate 30 counterclockwise to unlock it from tube 13. Thereafter, with the fixed pivot pin 17 in the right hand ends of apertures 28, the stirrup 18 swings counterclockwise now about pin 17 as a pivot. During this swinging movement, the locking plate 30 is held open but the locking plate 29 is pressed even more tightly locked against tube 13 by the operating pin 25 pressing on the lower end of the locking plate 29.

With the locking plate 30 unlocked and the locking plate 29 locked, continued counterclockwise movement of lever 26 forces the operating pin 25 to push against the locking plate 29 and to push it to the right as seen in FIG. 2. Indeed, operating pin 25 swings counterclockwise about the pin 17 and rides up along the lower left upright surface of locking plate 29 as seen in FIG. 2, so that plate 29 is forced to the right as seen in FIG. 2, and with it the tube 13.

Then when the movement of lever 26 is reversed and lever 26 is pushed down again, the locking plate 29 that advanced with tube 13 is released and is free to return to the position shown in FIG. 2; and it does so, because the spring 32 pulls it in that direction. Spring 32 pulls against the lower end of the locking plate 29 and thus tends to turn it clockwise to its unlocked position, so that the plate 29 can slide freely back along tube 13 without carrying tube 13 back with it. The parts are then again in the position of FIG. 2, whereupon another pull on the lever 26 will send tube 13 to the right another increment of similar length to the first increment.

Naturally, pushing down on lever 26 reverses the operation of the parts and causes tube 13 to be carried to the left in FIG. 2 by a distance that is equal to the horizontal component of clockwise swinging movement of operating pin 25.

We claim:

1. An assembly of a movable member and lockable adjustment means therefor; comprising said movable member, two apertured locking members which are urged in opposite directions to limit positions and through which said movable member passes, said locking members frictionally engaging the movable member with a locking action so that when in said limit positions they lock the movable member against movement in either direction, and manually operable adjusting means which can be operated to engage either one of the locking members to move it, and with it the movable member, in the corresponding direction away from the corresponding limit position and at the same time engage the other locking member to free it from locking engagement with the movable member, and resilient means which on release of the adjusting means return both locking members to said limit positions in locking engagement with the movable member without return movement of the latter.

2. Adjustment means according to claim 1, wherein the locking members are in the form of apertured friction plates normally oppositely inclined with respect to the direction of movement of the movable member so that corresponding edges of the apertures engage the movable member with a servo-locking action.

3. Adjustment means according to claim 1, wherein the manual adjusting means act simultaneously to engage one locking member and move it with the movable member away from the limit position and to engage the other locking member and move it to a position in which it is substantially free in the frictional sense from the movable member.

4. Adjustment means according to claim 1, wherein said resilient means comprise a common return spring connected between the two locking members urging them to the limit positions to which they are returned by the spring after each adjusting movement.

5. The combination of a movable elongated member, and locking and adjustment means for the movable member; said locking and adjustment means being adapted for mounting in a fixed position and comprising two spaced apertured locking members through which said movable member passes, said locking members being movable in opposite directions longitudinally of the movable member towards and away from limit portions which are fixed independently of the adjusted position of the movable member, spring means urging said locking members to said limit positions in which they respectively frictionally engage and lock the movable member against movement in either lonigtudinal direction, and manually operable adjusting means which act to engage one of the locking members to move it with the movable member in the desired longitudinal direction of adjustment and at the same time engage the other locking member to vary the inclination thereof relatively to said longitudinal direction to release the locking action of said other locking member.

6. Adjustment means according to claim 5, wherein the manual adjusting means comprise a hand lever assembly generally pivotable from a central position in either direction to produce adjusting movement of the movable member in the corresponding direction.

7. Adjustment means according to claim 6, wherein the hand lever assembly directly engages the locking members.

8. Adjustment means according to claim 7, wherein the hand lever assembly is mounted on a fixed pivot pin for pivoting movement about that pin in a manner such that it is also capable of limited sliding movement on the pin laterally of the latter to produce the necessary simultaneous operation of the two locking members.

9. Adjustment means according to claim 8, wherein a separate lever return centralising spring is fitted and acts to centralise the hand lever assembly in respect of the sliding movement.

10. Adjustment means according to claim 8, wherein the operating member or hand lever has cam-like projections in the region of the pivot pin which engage one or other of the locking members to free it from locking engagement, and at the same time engages the other locking member at a position spaced from the pivot pin to produce adjusting movement of the latter locking member.

11. Adjustment means according to claim 10, wherein an adjusting member attached to the hand lever is of U shape with an operating pin mounted between the side limbs of the U at a position spaced from the pivot pin for engagement with the locking members to produce adjusting movement thereof.

12. The combination of a longitudinally movable tubular member, and locking and adjustment means for the tubular member; said means being adapted for fixed mounting and comprising two spaced locking plates through apertures in which the tubular member passes, spring means urging the locking plates in opposite directions to limit positions in which they are oppositely inclined with respect to the longitudinal axis of the tubular member so that the edges of said apertures engage the tubular member with a frictional locking action to lock that member against movement in either direction, a hand lever assembly movement of which in either direction from a central resting position engages the corresponding one of the locking plates to move it and the tubular member in the corresponding direction of adjustment and engages the other locking plate to alter the inclination thereof relatively to said longitudinal axis and hence release the locking action of said other locking plate, and spring means which return the lever assembly to said resting position on release of the lever at the end of adjusting movement.

13. The combination of claim 12, wherein said tubular member is a component part of a motor vehicle seat structure which is adjustable fore-and-aft of the vehcile.

14. The combination of claim 13, wherein the seat is of the bench type and said lever projects forwardly from beneath the seat for operation by a driver of the vehicle.

References Cited by the Examiner
UNITED STATES PATENTS

| | | | |
|---|---|---|---|
| 803,046 | 10/05 | Bjorneby et al. | 192—8 |
| 2,292,718 | 8/42 | Ryerson | 248—430 |
| 2,662,623 | 12/53 | McGogy | 74—531 X |
| 2,959,982 | 11/60 | Cadwallader | 74—531 |

CLAUDE A. LE ROY, *Primary Examiner.*

FRANK L. ABBOTT, *Examiner.*